US010638858B2

(12) United States Patent
Kim et al.

(10) Patent No.: US 10,638,858 B2
(45) Date of Patent: May 5, 2020

(54) REFRIGERATOR

(71) Applicant: LG ELECTRONICS INC., Seoul (KR)

(72) Inventors: Sang Oh Kim, Seoul (KR); Jungsang Yun, Seoul (KR); Dul Lae Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/308,302

(22) PCT Filed: Jun. 9, 2017

(86) PCT No.: PCT/KR2017/006040
§ 371 (c)(1),
(2) Date: Dec. 7, 2018

(87) PCT Pub. No.: WO2017/213466
PCT Pub. Date: Dec. 14, 2017

(65) Prior Publication Data
US 2019/0208925 A1 Jul. 11, 2019

(30) Foreign Application Priority Data
Jun. 9, 2016 (KR) .......................... 10-2016-0071672

(51) Int. Cl.
*A47F 3/04* (2006.01)
*F25D 23/06* (2006.01)
(Continued)

(52) U.S. Cl.
CPC .......... *A47F 3/0478* (2013.01); *A47F 3/0434* (2013.01); *F25D 23/02* (2013.01);
(Continued)

(58) Field of Classification Search
CPC ...... A47F 3/0478; A47F 3/0434; F25D 23/02; F25D 23/06; F25D 27/00; F25D 29/005; F25D 2700/04
See application file for complete search history.

(56) References Cited

U.S. PATENT DOCUMENTS 5,239,152 A * 8/1993 Caldwell .............. H01H 13/702
200/5 R
6,667,563 B2 * 12/2003 Bae ........................ G06F 3/0202
200/600
(Continued)

FOREIGN PATENT DOCUMENTS

JP 2015-179054 10/2015
JP 5869156 2/2016
(Continued)

OTHER PUBLICATIONS

International Search Report (with English Translation) and Written Opinion dated Sep. 18, 2017 issued in Application No. PCT/KR2017/006040.

*Primary Examiner* — Amare Mengistu
*Assistant Examiner* — Crystal Mathews
(74) *Attorney, Agent, or Firm* — KED & Associates, LLP

(57) ABSTRACT

A refrigerator comprises: a cabinet having a storage space; a door which opens/closes the cabinet and has an opening that communicates with the storage space; a panel provided in the opening that selectively becomes transparent according to an operation by a user; a sensing module provided inside the panel assembly that senses an approach of an object toward the panel; and a display module provided inside the panel assembly that displays information from the sensing module on the panel, wherein the sensing module comprises a light-emitting element that outputs a first optical
(Continued)

signal, and a light-receiving element that receives a second optical signal reflected by the object in front of the panel.

20 Claims, 17 Drawing Sheets

(51) Int. Cl.
    *F25D 27/00*     (2006.01)
    *F25D 23/02*     (2006.01)
    *F25D 29/00*     (2006.01)

(52) U.S. Cl.
    CPC ............. *F25D 23/06* (2013.01); *F25D 27/00* (2013.01); *F25D 29/005* (2013.01); *F25D 2400/36* (2013.01); *F25D 2700/04* (2013.01)

(56) References Cited

U.S. PATENT DOCUMENTS

| | | | | |
|---|---|---|---|---|
| 7,155,923 B2* | 1/2007 | Nam | ..................... | F25D 29/005 165/80.3 |
| 2006/0075696 A1* | 4/2006 | Alessandro | ............. | A47F 3/001 52/171.1 |
| 2006/0096303 A1* | 5/2006 | Kavounas | ............... | F25D 29/00 62/125 |
| 2008/0257706 A1* | 10/2008 | Haag | ..................... | H03K 17/962 200/600 |
| 2010/0319383 A1* | 12/2010 | Kim | ..................... | F25D 23/028 62/264 |
| 2011/0023527 A1* | 2/2011 | Kwon | ..................... | F25D 23/02 62/441 |
| 2011/0134627 A1* | 6/2011 | Hamlin | ............... | F21V 33/0044 362/92 |
| 2012/0146950 A1 | 6/2012 | Park et al. | | |
| 2012/0268669 A1* | 10/2012 | Ishikawa | ............. | G02F 1/13718 349/12 |
| 2012/0285089 A1* | 11/2012 | Artwohl | ................ | A47F 3/0434 49/70 |
| 2013/0033163 A1* | 2/2013 | Kang | .................... | F25D 23/025 312/405.1 |
| 2013/0049562 A1* | 2/2013 | Jung | ..................... | F25D 23/028 312/405 |
| 2013/0249827 A1* | 9/2013 | Jeong | .................... | G06F 3/0414 345/173 |
| 2013/0327075 A1* | 12/2013 | Kim | ...................... | F25D 29/005 62/246 |
| 2014/0144083 A1* | 5/2014 | Artwohl | ................ | A47F 3/0434 49/70 |
| 2014/0184577 A1* | 7/2014 | Kim | ......................... | G09G 5/10 345/207 |
| 2014/0203863 A1* | 7/2014 | Gillespie | ........... | H03K 17/9622 327/517 |
| 2015/0069900 A1* | 3/2015 | Lim | ...................... | F25D 23/028 312/405 |
| 2015/0170608 A1* | 6/2015 | Kim | ......................... | G09G 5/14 345/592 |
| 2015/0228253 A1* | 8/2015 | Lee | .......................... | G09G 5/30 345/592 |
| 2015/0241116 A1* | 8/2015 | Choi | .................... | E05B 65/0042 312/404 |
| 2015/0260445 A1* | 9/2015 | Kim | ...................... | F25D 23/028 312/405 |
| 2015/0276302 A1* | 10/2015 | Roh | ................. | G02F 1/133377 62/56 |
| 2015/0323670 A1 | 11/2015 | Shirasaka | | |
| 2016/0003519 A1* | 1/2016 | Kim | ...................... | F25D 29/005 362/307 |
| 2016/0117022 A1 | 4/2016 | Kim et al. | | |
| 2016/0188093 A1* | 6/2016 | Kim | ...................... | F25D 29/005 |

FOREIGN PATENT DOCUMENTS

| | | |
|---|---|---|
| KR | 10-2012-0066342 | 6/2012 |
| KR | 10-2016-0045545 | 4/2016 |
| KR | 10-2016-0048587 | 5/2016 |

* cited by examiner

REFRIGERATOR

TECHNICAL FIELD

This application relates to a refrigerator.

BACKGROUND ART

A refrigerator is a device which can keep food fresh for a certain period by cooling a freezer compartment or a refrigerator compartment to a specific temperature while repeating a freezing or refrigeration cycle. Generally, a cabinet that forms a storage space and a door that opens or closes a storage space are included in the refrigerator. Stored goods such as food are stored in the storage space, and the user can open the door to keep the stored goods or to take out the kept stored goods.

The most basic and important function of the door of the refrigerator that has this structure is to facilitate a storage or a take-out of the stored goods while making a cool air in the storage space formed inside a cabinet not leak to the outside of the refrigerator. In accordance with the requirements described above, a conventional refrigerator door has been made of an opaque material that is advantageous for cool air maintenance.

However, according to a widespread supply of the refrigerator, in addition to the basic function mentioned above, various requirements for an additional function of the refrigerator are increasing. Recently, a refrigerator that has a door that displays various information related to a refrigerator, for example, information related to a control of the refrigerator or information on the stored goods stored inside the refrigerator is being developed. In such a refrigerator, a display device capable of displaying various information is coupled to the outer surface of the refrigerator door made of an opaque material. The information related to the control of the refrigerator, for example, the information related to the stored goods stored inside the refrigerator or a temperature of the storage compartment of the refrigerator, is displayed through the display device.

Further, a conventional refrigerator is provided with an input device for controlling the refrigerator or inputting a command for searching information by referring to the information displayed through the display device. As the input device provided in the refrigerator, a button type input device that has a physical button or a touch type input device with which a pressure sensing type or a capacitive type touch technology is applied.

On the other hand, in recent years, a refrigerator that a part of a door is formed with a transparent material such as glass is being developed. Through the door described above, the user can identify as to which stored goods are stored inside the storage compartment of the refrigerator without opening the door, so that it is possible to reduce a loss of cool air and to save time for searching the stored goods.

However, it is very difficult to use a conventional button type input device or a touch type input device to which a pressure sensitive or capacitive type touch technology is applied for a refrigerator that has a door formed of such a transparent material. For example, placing a physical button on the transparent panel of the refrigerator door lowers a transparency of the transparent panel and impairs an esthetic sensibility of the refrigerator itself due to a presence of physical buttons.

Further, in the case of pressure sensitive type touch technology, a material that has a predetermined level of elasticity has to be applied to a panel to distinguish a pressure when the user presses the panel. However, the transparent material such as glass is very difficult to obtain the elasticity suitable for the pressure sensitive touch technology.

Further, when the pressure sensitive type or capacitive type touch technology is applied to the entire transparent panel, the price of a refrigerator rises too much due to a high production cost. Further, the pressure sensitive type or capacitive type touch panel has a problem that it has a high failure occurrence rate, and even if a failure occurs in some areas, the entire panel has to be replaced, thereby increasing repair cost.

DISCLOSURE

Technical Problem

An object of this application is to provide a refrigerator that enables an accurate and easy control of the refrigerator without degrading transparency of a refrigerator door formed with a transparent material.

It is another object of this application to provide a refrigerator that can reduce a failure occurrence rate and repair cost in case of the failure occurrence while minimizing production cost of the refrigerator that has a door formed with a transparent material.

The objects of this application are not limited to the above-mentioned objects, and the other objects and advantages of this application which are not mentioned can be understood by the following description, and more clearly understood by the embodiment of this application. It will also be easily seen that the objects and advantages of this application may be realized by means indicated in the patent claims and a combination thereof.

Technical Solution

In this application for achieving such an object, a refrigerator is characterized in including: a cabinet that a storage space is formed therein; a door that opens and closes the cabinet and has an opening that communicates with the storage space; a panel assembly that is provided in the opening and becomes selectively transparent according to an operation of a user; a sensing module that is arranged inside the panel assembly and senses an approach of an object in an input area formed on a front surface of the panel assembly to generate a sensing signal; and a display module that is arranged inside the panel assembly and displays information determined by the sensing signal through a display area formed on a front surface of the panel assembly, and wherein the sensing module includes: a light emitting element that outputs an optical signal for sensing the approach of the object; and a light receiving element that receives an optical signal reflected by the object among the optical signals outputted by the light emitting element and generates the sensing signal in accordance with a reception of the optical signal.

Further, in accordance with an exemplary embodiment of this application, a refrigerator is characterized in including: a cabinet that a storage space is formed therein; a main door that opens and closes the cabinet and has an opening that communicates with the storage space; a sub-door that is rotatably mounted on the main door and opens and closes the opening, a panel assembly that forms a front surface of the sub door and becomes selectively transparent according to an operation of a user, a sensing module that is arranged inside the panel assembly and senses an approach of an object in an input area formed on a front surface of the panel assembly to generate a sensing signal; and a display module that is arranged inside the panel assembly and displays information determined by the sensing signal through a display area formed on a front surface of the panel assembly, and wherein the sensing module includes: a light emitting element that outputs an optical signal for sensing the approach of the object; and a light receiving element that receives an optical signal reflected by the object among the optical signals outputted by the light emitting element and generates the sensing signal in accordance with a reception of the optical signal.

It is not preferable to apply a conventional button type input device or the pressure sensitive or capacitive type input device to a refrigerator that has a door formed with a transparent material due to the above-mentioned problems. The refrigerator according to this application includes a sensing module that includes a light emitting element that outputs an optical signal and a light receiving element that receives a light signal that is returned by being reflected on the surface of the object and generates a sensing signal to overcome the above-mentioned problems.

As such a sensing module is arranged on a rear surface of the front panel included in the panel assembly and occupies a small space, it is possible to minimize a degradation of a transparency of the door formed with the transparent material and an esthetic sensibility degradation of a refrigerator door.

Further, as described above, the sensing module can lower production cost of the refrigerator since cost of a component is lower than that of the conventional button type input device or pressure sensitive type or capacitive type input device.

Further, the refrigerator that includes the sensing module according to this application has a lower failure occurrence rate than the conventional button type input device or a pressure sensitive type or capacitive type input device, and even if a failure occurs, since only the light emitting element or the light receiving element has to be replaced, a repair is easy and repair cost is low.

Advantageous Effects

According to this application, there is an advantage that an accurate and easy refrigerator control is possible without degrading a transparency of a refrigerator door formed with a transparent material.

Further, this application has an advantage capable of reducing a failure occurrence rate and repair cost in the case of a failure occurrence while minimizing production cost of a refrigerator that has a door formed with the transparent material.

BEST MODE

Figure 1:
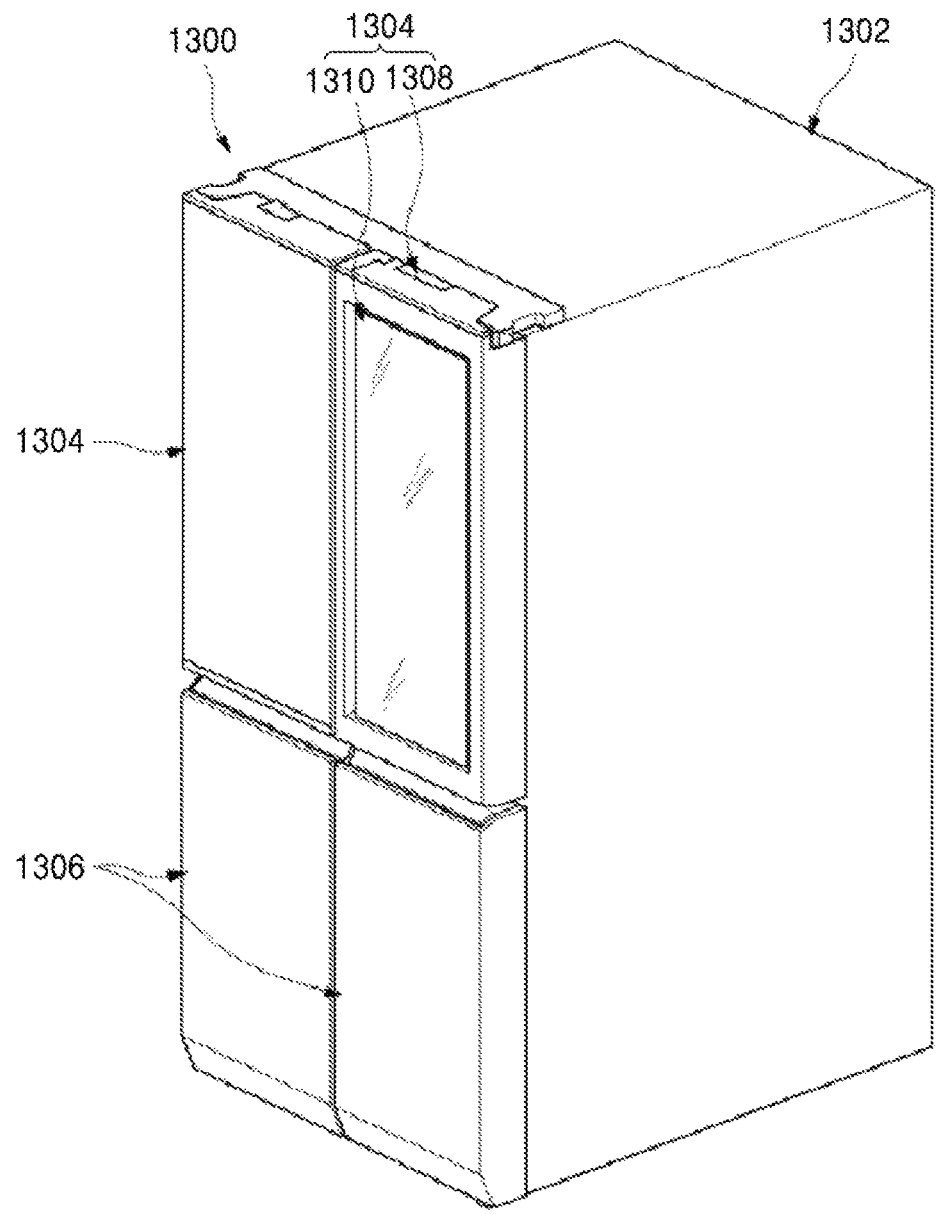
FIG. 1 is a perspective view of a refrigerator according to an exemplary embodiment of this application.

The above mentioned objects, features and advantages of this application will be described in detail with reference to the accompanying drawings, and accordingly, those skilled in the art to which this application pertains can easily perform the technical idea of this application. In describing this application, when it is determined that the detailed description of the known art related to this application may unnecessarily obscure the gist of this application, a detailed description thereof will be omitted. Hereinafter, a preferred embodiment according to this application will be described in detail with reference to the accompanying drawings. The same reference numeral in the drawings is used to indicate the same or similar component.

Figure 2:
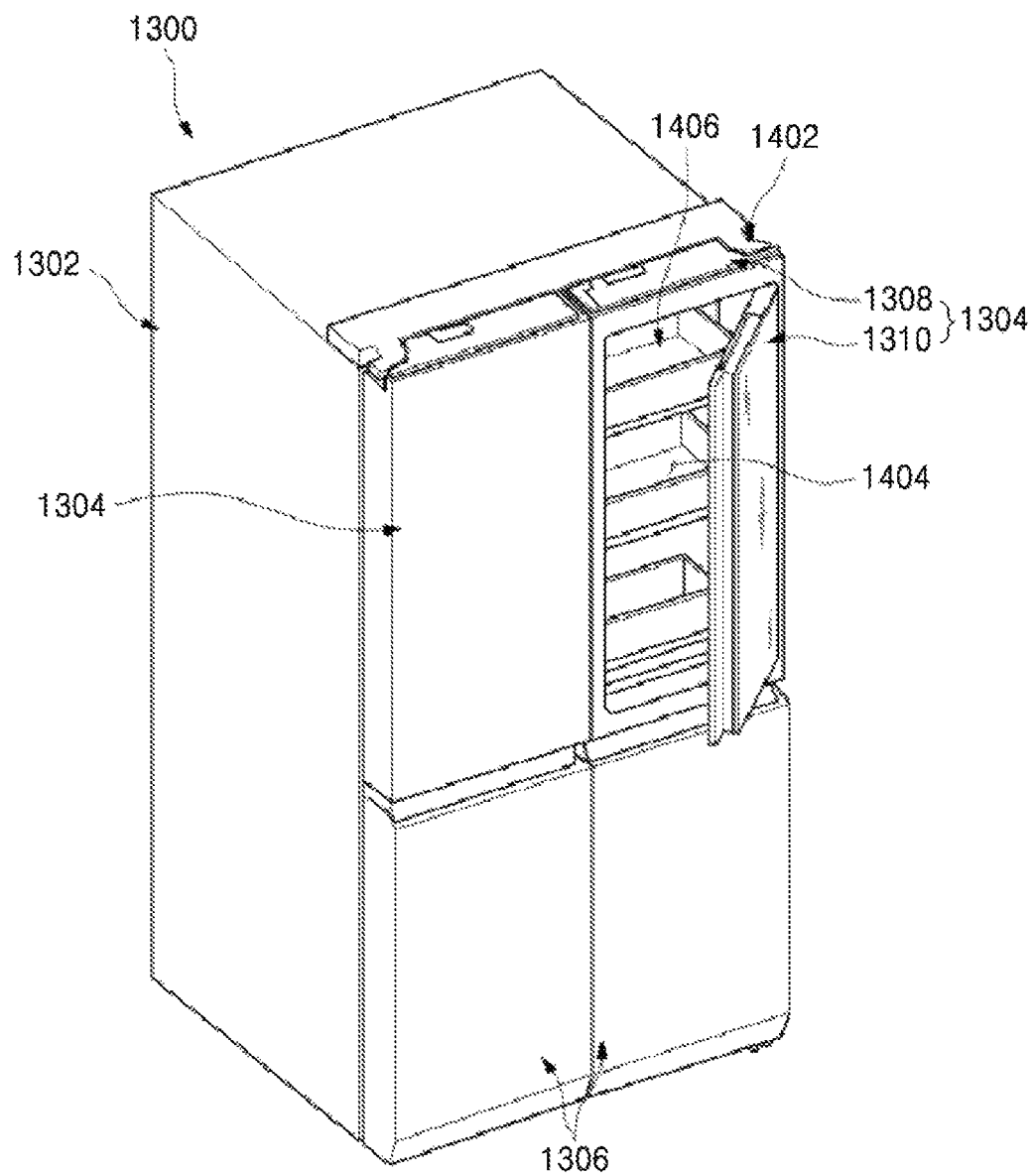
FIG. 2 is a perspective view of a refrigerator in which a sub-door is opened according to an exemplary embodiment of this application.

FIG. 1 is a perspective view of a refrigerator according to an embodiment of this application, and FIG. 2 is a perspective view of a refrigerator in which a sub-door according to an embodiment of this application.

Referring to FIGS. 1 and 2, a refrigerator 1300 according to an embodiment of this application may include a cabinet 1302 that a storage space is formed therein, and doors 1304 and 1306 for opening and closing a storage space formed in a cabinet 1302.

The storage space formed inside the cabinet 1302 can be divided up and down by a barrier. A refrigerator compartment may be formed on an upper portion of the cabinet 1302 shown in FIGS. 1 and 2, and a freezer compartment may be formed on a lower portion of the cabinet 1302. The refrigerator of the embodiment shown in FIGS. 1 and 2 may be a bottom freeze type refrigerator in which a freezer compartment is provided downwardly, and a French type door, in which a pair of doors are rotated and opens and closes a space, may be applied. However, according to the embodiment, a refrigerator compartment may be formed on the right side (or left side) of the cabinet 1302, and a freezer compartment may be formed on the left side (or the right side) of the cabinet 1302.

Referring back to FIGS. 1 and 2, a refrigerator compartment door 1304 and a freezer compartment door 1306 may be rotatably coupled to a front surface of the cabinet 1302. The refrigerator compartment door 1304 may be coupled to a front surface of the refrigerator compartment to open and close a storage space inside the refrigerator compartment, and the freezer compartment door 1306 may be coupled to the front surface of the freezer compartment to open and close a storage space inside the freezer compartment. The refrigerator compartment door 1304 and the freezer compartment door 1306 may be provided in pair of the left and right as shown in FIGS. 1 and 2 and may be formed to shield the refrigerator compartment and the freezer compartment, respectively.

A plurality of door baskets may be provided inside the refrigerator compartment door 1304 and inside the freezer compartment door 1306. This door basket may be arranged so as not to be interfered with the storage members provided inside the cabinet 1302 in a state where the refrigerator compartment door 1304 and the freezer compartment door 1306 are closed.

The right door 1304 of the refrigerator compartment door 1304 shown in FIGS. 1 and 2 may include a main door 1308 and a sub-door 1310. The main door 1308 may have an opening and may be rotatably coupled to a cabinet 1302 to open and close a part (a right side) of the refrigerator compartment. The sub-door 1310 may be rotatably coupled to an inside of the main door 1308 to open and close an opening formed in the main door 1308. In another embodiment of this application, the sub-door 1308 may be fixedly coupled to the main door 1308.

Referring to FIG. 2, an opening 1404 may be formed in the main door 1308. A door basket 1406 may be mounted on the rear surface of the main door 1308 including an inside of the opening 1404. Accordingly, the user can access the door basket 1406 without opening the main door 1308 through the opening 1404.

As shown in FIG. 2, the sub-door 1310 rotatably mounted inside the main door 1803 can be opened by a user. The user can access the opening 1404 formed in the main door 1308 in accordance with an opening of the sub-door 1310.

On the other hand, at least a part of the sub-door 1310 may be made of a transparent material such as glass. Therefore, the user can see through an inside of the opening 1404 even in a state in which the sub-door 1310 is closed. In an embodiment of this application, the sub-door 1310 may be made of a glass material that becomes selectively transparent in accordance with an operation of the user. The user can control a light transmissivity or a reflectivity of the sub-door 1310 by operating the refrigerator. In other words, the user can operate the refrigerator to make the sub-door 1310 in a transparent state or in an opaque state.

Figure 3:
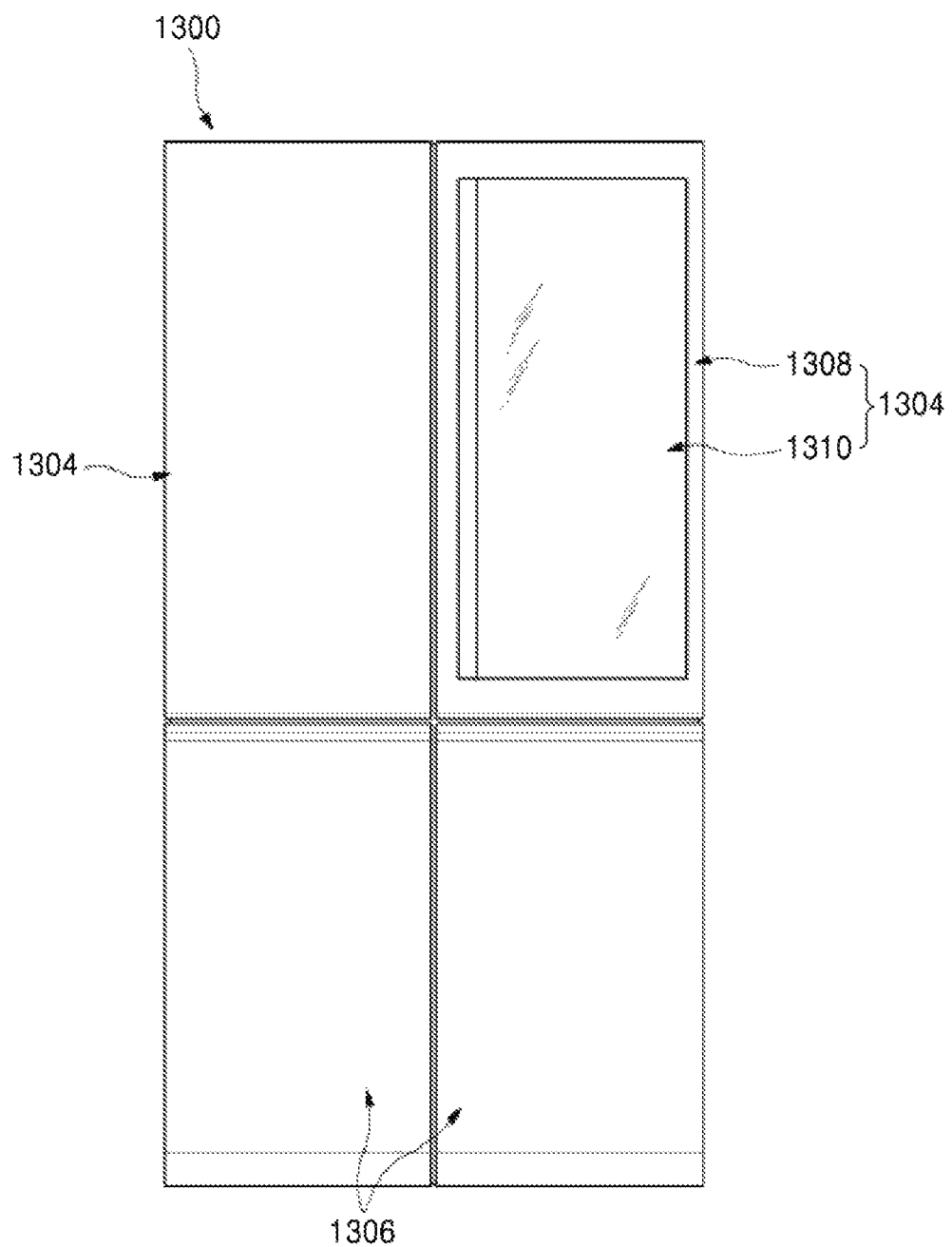
FIG. 3 is a front view in which a sub-door of a refrigerator is in an opaque state according to an exemplary embodiment of this application.
Figure 4:
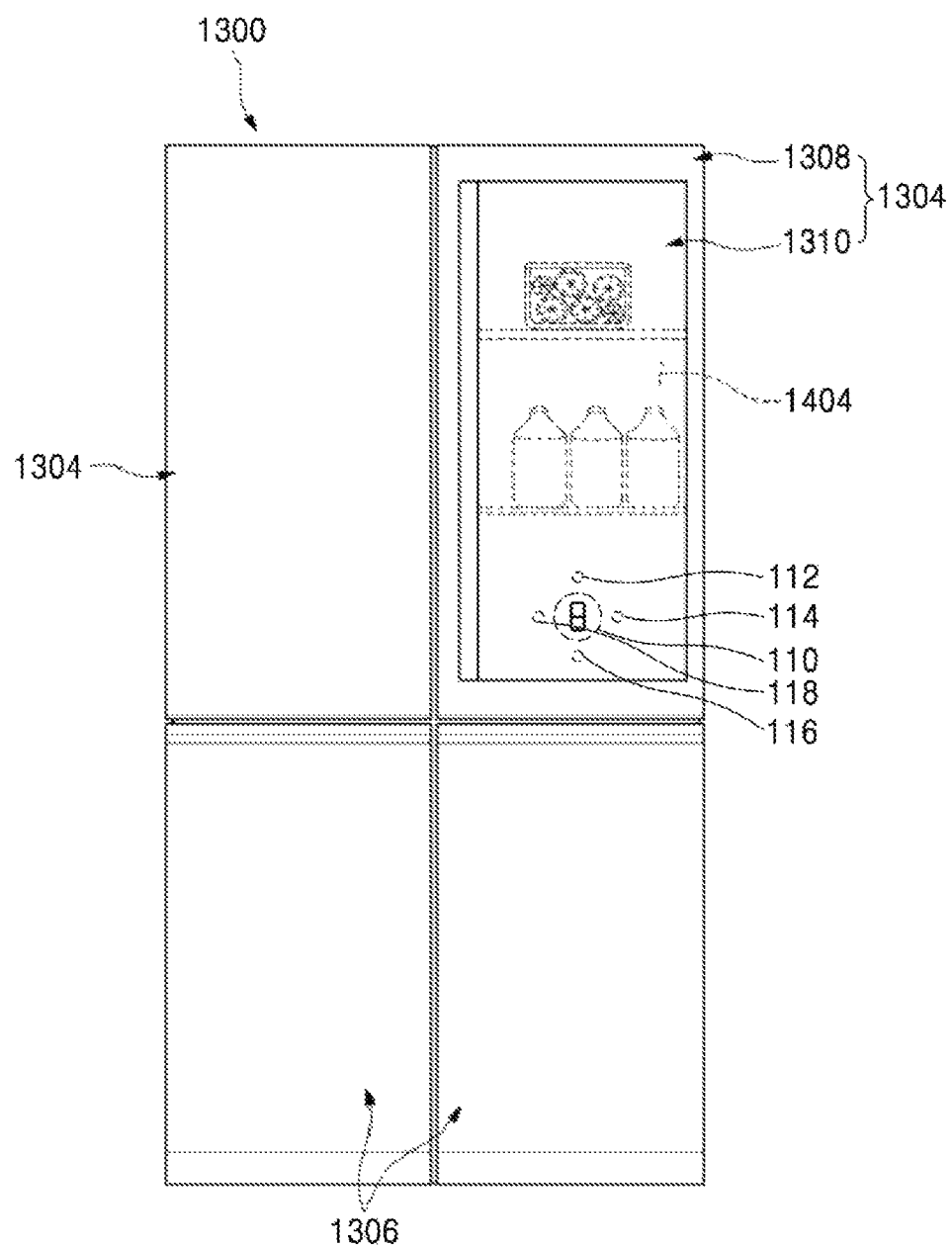
FIG. 4 is a front view in which a sub-door of a refrigerator is in a transparent state according to an exemplary embodiment of this application.

FIG. 3 is a front view in which a sub-door of a refrigerator according to an embodiment of this application is in an opaque state, and FIG. 4 is a front view in which a sub-door of a refrigerator according to an embodiment of this application is in a transparent state.

As shown in FIG. 3, when a user does not operate a refrigerator 1300 in a state where both a main door 1308 and a sub-door 1310 are closed, the sub-door 1310 maybe in an opaque black color or a mirror-like state. Accordingly, the user cannot see an inside of a refrigerator compartment through the sub-door 1310.

On the other hand, the user can make the sub-door 1310 be in a transparent state through a specific operation. When the sub-door 1310 becomes a transparent state, as shown in FIG. 4, a storage space disposed on a rear surface of a main door 40 and an internal space of a refrigerator compartment can be made visible. Therefore, the user can identify a storage state of the storage space disposed on the rear surface of the main door 1308 and the inner space of the refrigerator compartment without opening the sub-door 1310 or the main door 1308.

Referring back to FIG. 4, a display area 110 and the input areas 112, 114, 116 and 118 may be formed on a front surface of a sub-door 1310 according to an exemplary embodiment of this application.

The display area 110 may be an area where information related to a refrigerator is displayed. The display area 110 may be displayed on the front surface of the sub-door 1310 as a figure such as a circle or a quadrangle for a distinguishment from other areas. A display module for displaying information in the display area 110 may be arranged inside the sub-door 1310.

The input areas 112, 114, 116, 118 may be an area for a user to input a command to a refrigerator by approaching a part of the body, for example, a finger. A figure (for example, a key shaped figure) or characters (for example, 'lock/unlock') for displaying a function of each area may be displayed in the input areas 112, 114, 116, and 118. A sensing module for sensing an approach of an object through the input areas 112, 114, 116, and 118 and generating a sensing signal may be arranged inside the sub-door 1310.

The user can make a part of the body, for example, a finger be approached to any one of the input areas 112, 114, 116 and 118 to give a control command to the refrigerator or change information displayed in the display area 110.

For example, when the sub-door 1310 is in an opaque state as shown in FIG. 3, when the user approaches the finger to any one of the input areas 112, 114, 116, and 118, an access of the user may be sensed, and the sub-door 1310 can be changed to a transparent state as shown in FIG. 4. As shown in FIG. 4, when the sub-door 1310 is in a transparent state, preset information can be displayed in the display area 110, and the figure (for example, the key shaped figure) or characters (for example, 'lock/unlock') for displaying the function of each area can be displayed in the input areas 112, 114, 116, and 118.

Hereinafter, a configuration of a main door and a sub-door according to an exemplary embodiment of this application will be described in detail.

Figure 5:
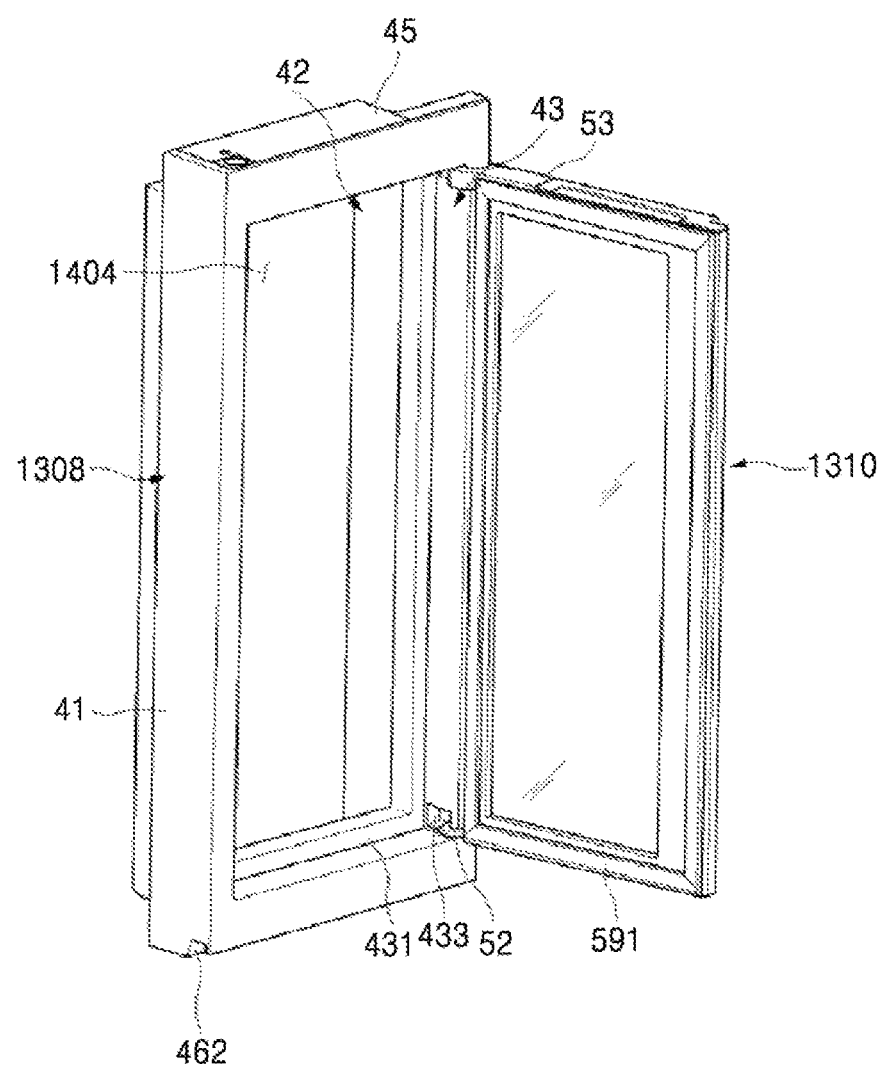
FIG. 5 is a perspective view of a main door and a sub-door coupled to the main door according to an exemplary embodiment of this application.

FIG. 5 is a perspective view of a main door and a sub-door coupled with a main door according to an exemplary embodiment of this application.

As shown in FIG. 5, an outer shape of the main door 1308 may be formed by a metal material out plate 41 and a door liner 42 coupled to an out plate 41, and a door cap deco provided at an upper end of an out plate 41 and a door liner 42. As not shown in FIG. 5, a door cap deco may be arranged even in a lower end of the door liner 42.

The out plate 41 may be formed of a plate type stainless steel material and may be bent to form a part of a front surface and a peripheral surface of a main door 40. Further, the out plate 41 may have an opening 1404. A plurality of concave-convex structures may be formed in the opening 1404 so that a door basket can be mounted.

The door liner 42 can be injected with a plastic material and may form a rear surface of a main door 1308. A rear gasket (not shown) may be provided in a perimeter of a rear surface of the door liner 42. The rear gasket may be closely contacted with a perimeter of a cabinet 1302 to prevent a leakage of cool air between a main door 1308 and a cabinet 1302.

A door lighting unit (not shown) for illuminating an inside of the opening 1404 may be provided on an upper surface of the door liner 42. The door lighting unit can irradiate light from an upper side downwards of the opening 1404 to illuminate an entire opening including the door basket. As the door lighting unit irradiates the light, a sub-door 1310 can be in a transparent state.

The cab deco 45 may be formed with a hinge mounting portion for allowing the main door 1308 to be rotatably mounted on the cabinet 1302. Further, a door handle 462 may be depressed in a cab deco (not shown) on a lower surface of the main door 1308. The user can open or close the main door 1308 by putting a hand into a door handle 462.

A door frame 43 may further be formed between the out plate 41 and the door liner 42. The door frame 43 may be coupled between the out plate 41 and the door liner 42 and form a perimeter of an opening 1404. An insulating material may be arranged inside a peripheral area of the opening 1404 to insulate an inside and an outside of the cabinet 1302.

A frame stepped portion 431 protruding inward may be formed on an inner surface of the door frame 43. Accordingly, the frame stepped portion 431 can support a sub-door 1310 when the sub-door 1310 is closed. The frame stepped portion 431 may be provided with a front gasket for sealing a main door 1308 and a sub-door 1310 by contacting a rear surface of the sub-door 1310 when the sub-door 1310 is closed.

A frame heater (not shown) may be provided on a rear surface of the frame stepped portion 431. The frame heater may be arranged along the frame stepped portion 431 to heat the frame stepped portion 431. A temperature of a surface of the frame stepped portion 431 may be relatively low due to an influence of cool air inside the refrigerator compartment. Therefore, a dew condensation may be generated on the surface of the frame stepped portion 431, and it is possible to prevent the dew condensation by driving a frame heater.

Referring back to FIG. 5, a hinge hole 433 that a sub hinge 52 for a mounting of the sub-door 1310 is mounted may be opened at one side of the door frame 43. The hinge hole 433 may be opened at a position that faces a side surface of the sub-door 50 and may be formed such that the sub hinge 52 can be inserted.

Figure 6:
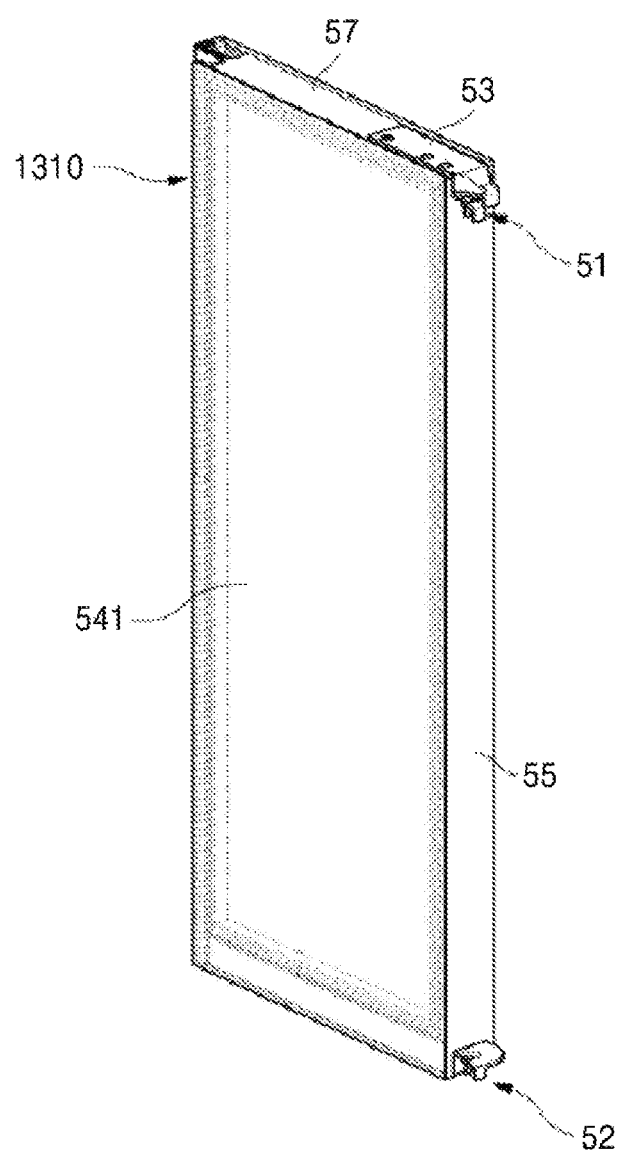
FIG. 6 is a perspective view of a sub-door according to an exemplary embodiment of this application.
Figure 7:
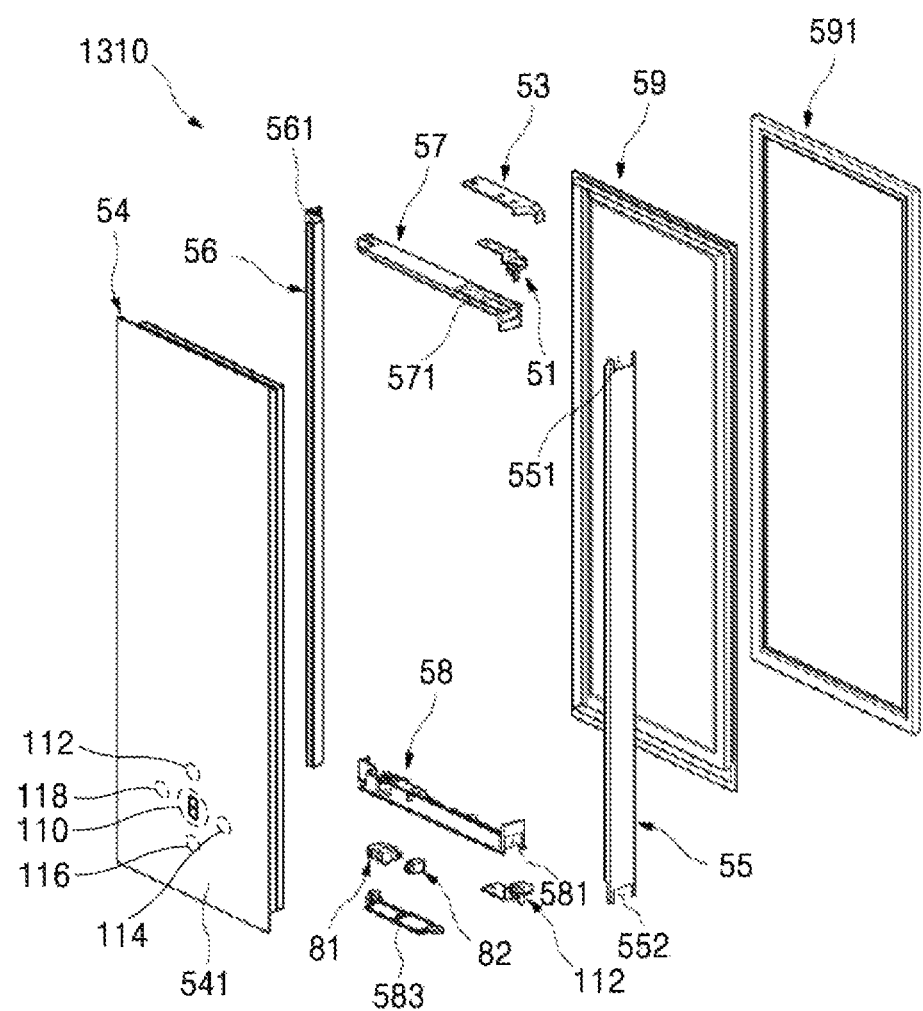
FIG. 7 is an exploded perspective view of a sub-door according to an exemplary embodiment of this application viewed from the front.
Figure 8:
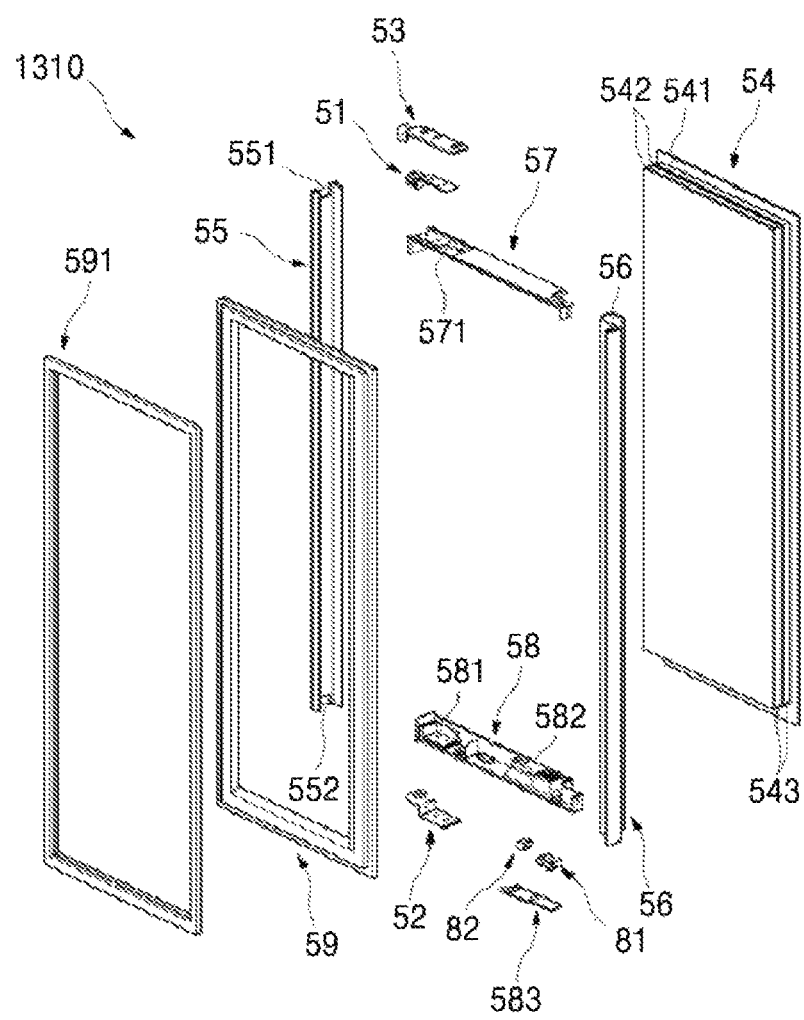
FIG. 8 is an exploded perspective view of a sub-door according to an embodiment of this application viewed from the rear.

FIG. 6 is a perspective view of a sub-door according to an exemplary embodiment of this application. FIG. 7 is an exploded perspective view of a sub-door according to an exemplary embodiment of this application, viewed from the front. FIG. 8 is an exploded perspective view of a sub-door according to an exemplary embodiment of this application, viewed from the rear.

As shown in the Figure, a sub-door 1310 may have a shape corresponding to a shape of an opening 1404. The sub-door 1310 may include a panel assembly 54 that includes a plurality of panels stacked at a predetermined distance, the side frames 55 and 56 that form both side surfaces of a sub-door 1310, a sub-door liner 59 that forms a perimeter of a rear surface of a sub door 1310, and an upper cap deco 57 and a lower cap deco 58 that form an upper surface and a lower surface of a sub door 1310.

The panel assembly 54 may form an entire surface of a front surface the sub-door 1310. The panel assembly 54 may be formed of a front panel 541 that forms a front surface appearance and an insulation panel 542 spaced from a rear surface of a front panel 541. The insulation panel 542 may be formed in plurality and a spacer 543 may be provided between the front panel 541 and the insulation panel 542 and between the plurality of insulation panels 542.

The front panel 541 and the insulation panel 542 may be formed of a material capable of seeing through an inside of the refrigerator compartment or the freezer compartment, such as glass, so as to selectively see through the inside the refrigerator compartment or the freezer compartment. The front panel 541 and the insulation panel 542 may have an insulating material or an insulating structure and can be formed so that cool air inside the refrigerator compartment or the freezer compartment is not discharged.

The side frames 55 and 56 may form both side surfaces in the left and right of a sub-door 1310. The side frames 55 and 56 may be formed of a metal material and connect a panel assembly 54 and a door liner 42. The side frames 55 and 56 may include a first side frame 55 that forms a side on which the sub hinges 51 and 52 are mounted and a second side frame 56 formed with a handle 561 that a user does a rotation operation.

The first side frame 55 may be extended lengthways up and down and formed to connect between an upper hinge 51 and a lower hinge 52. The upper end and the lower end of the first side frame 55 may be formed with the hinge insertion portions 551 and 552 into which the upper hinge 51 and the lower hinge 52 are inserted. The hinge insertion portions 551 and 552 may be formed by being depressed at an upper end and a lower end of a first side frame 55 and may be formed in a corresponding shape so that a part of an upper hinge 51 and a lower hinge 52 can be formed.

The second side frame 56 may be formed of a metal or a material that has high strength, such as the first side frame 55. The second side frame 56 can be extended from an upper end to a lower end of the sub-door 1310 and may include a handle 561 depressed so that the user can put a hand.

The upper cab deco 57 may form an upper surface of a sub-door 1310 and connect an upper end of a first side frame 55 and a second side frame 56. Further, the upper cab deco 57 may be coupled to an upper end of a panel assembly 54 and an upper end of a sub-door liner 59.

An upper hinge mounting portion 571 may be formed at one side end of the upper cap deco 57. The upper hinge mounting portion 571 may be depressed so that an upper hinge 51 and a hinge cover 53 can be mounted, and an upper surface of the hinge cover 53 and the upper cap deco 57 may form the same plane in a state in which the hinge cover 53 is mounted.

The lower cab deco 58 may form a lower surface of a sub-door 1310 and connect a lower end of a first side frame 55 and a second side frame 56. Further, a lower cab deco 58 may be coupled to a lower end of a panel assembly 54 and a lower end of a sub-door liner 59.

A lower hinge mounting portion 581 may be formed at one end of the lower cap deco 58. The lower hinge mounting portion 581 may be depressed so that a lower hinge 52 can be mounted.

The sub-door liner 59 may form a shape of a perimeter of a rear surface of a sub-door 1310 and can be injected with a plastic material. The sub-door liner 59 may be coupled to a first side frame 55, a second side frame 56, an upper cap deco 57, and a lower cab deco 58. A foamed liquid may be injected into an inner space in a perimeter of a sub-door 1310 formed by the sub-door liner 59 so that an insulating material (not shown) is filled and it may provide an insulating structure in the perimeter of the sub-door 1310.

That is, the insulating structure may be formed by the insulation panel 542 included in the panel assembly 54 at the central portion of the sub-door 1310 and the insulating structure may be formed by the insulating material in the perimeter of the panel assembly 54.

A sub-door gasket 591 may be provided on a rear surface in the sub-door liner 59. The sub-door gasket 591 may be formed to be closely contacted with a main door 1308 when the sub door 1310 is closed. Accordingly, it is possible to prevent a cool air leakage between a main door 1308 and a sub-door 1310.

Hereinafter, a structure of a panel assembly according to an exemplary embodiment of this application will be described in detail.

Figure 9:
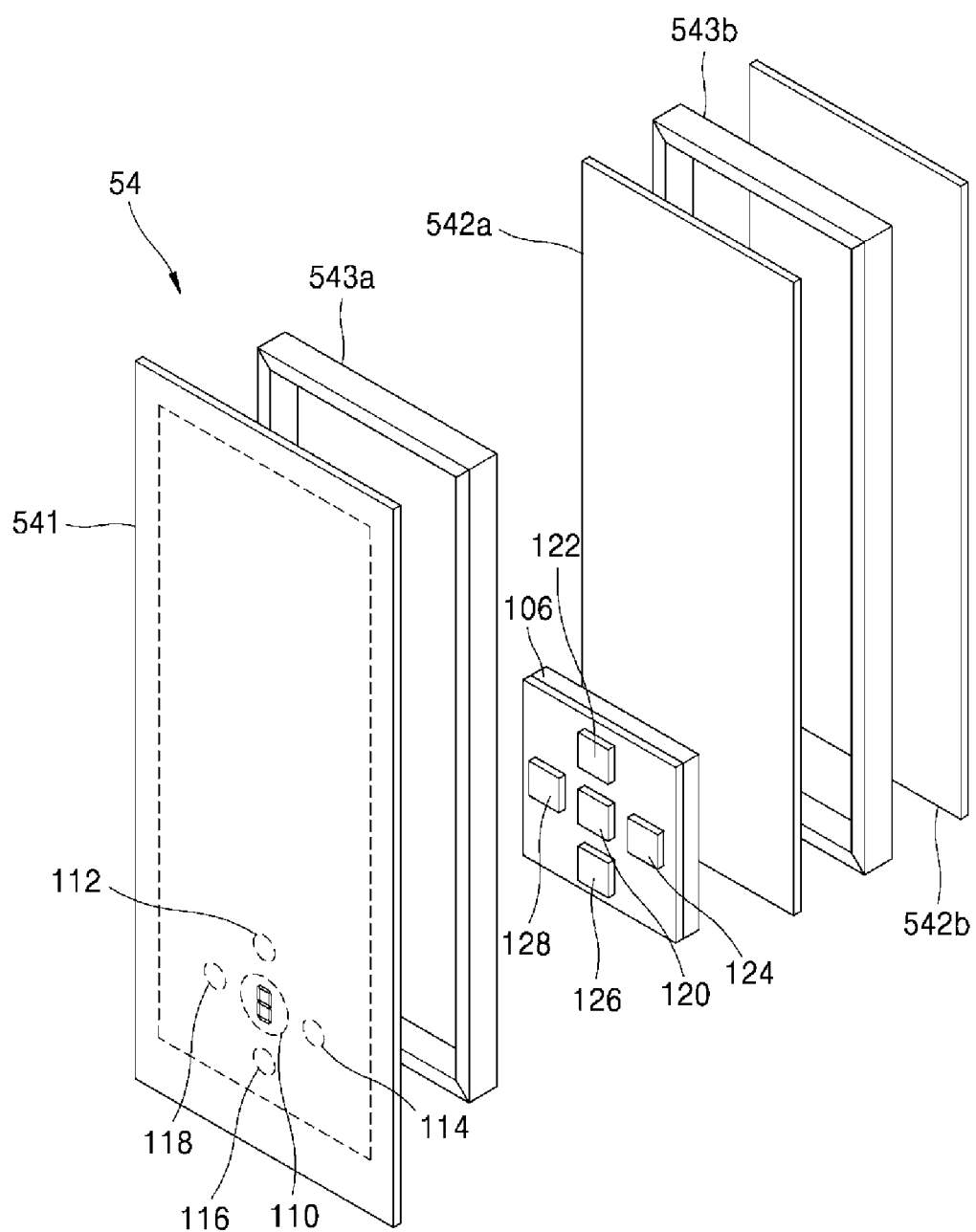
FIG. 9 is an exploded perspective view of a panel assembly according to an embodiment of this application.

FIG. 9 is an exploded perspective view of a panel assembly according to an exemplary embodiment of this application.

Referring to FIG. 9, a panel assembly 54 according to an exemplary embodiment of this application may include a front panel 541, a first spacer 543a, a first insulation panel 542a, a second spacer 543b, and a second insulation panel 542b. Further, the panel assembly 54 may include an input/output interface module 106 arranged between a front panel 541 and a first insulation panel 542a. The input/output interface module 106 may include a display module 120, and the sensing modules 122, 124, 126, and 128. In the embodiment of FIG. 9, only two spacers 543a and 543b and two insulation panels 542a and 542b are shown; however, according to an embodiment, more of the spacers and insulation panels may be included in the panel assembly 54.

The front panel 541 may be formed of a glass material that becomes selectively transparent or opaque according to an operation of a user. In this application, such a glass material may be referred to as a half mirror. As described above, the front panel 541 made of the half mirror may become selectively transparent depending on an amount of light irradiated by a lighting unit provided in a cabinet 1302 or a main door 1308. That is, in a state in which the lighting unit is turned on, the front panel 541 becomes transparent so that the user can see the front panel 54 through a storage space on a rear surface of a sub-door 1310. Conversely, in a state in which the lighting unit is turned off, the front panel 541 becomes opaque, so that the user cannot see an inside of the refrigerator through the front panel 541.

Referring back to FIG. 9, a display area 110 and the input areas 112, 114, 116, and 118 may be formed on the front panel 541.

The display area 110 may be an area where information related to a refrigerator output, which is displayed by a display module 120 is displayed. The display area 110 may be displayed on a front panel 541 in a figure of a circle and a quadrangle, etc., for a distinguishment from other areas. The display module 120 may be arranged at a position corresponding to the display area 110 on a rear surface of the front panel 541.

The input areas 112, 114, 116, and 118 may be an area that a user inputs a command to a refrigerator by approaching an object, for example, a part of the body such as a finger. A figure for displaying a function of each area (for example, a key shaped figure) or characters (for example, 'lock/unlock') may be displayed in the input areas 112, 114, 116, and 118. The sensing modules 122, 124, 126, and 128 may be arranged respectively on the position corresponding to the input areas 112, 114, 116, and 118 of the rear surface of the front panel 541.

Accordingly, the user can approach a part of the body, for example, a finger to any one of the input areas 112, 114, 116, and 118 to give a control command to the refrigerator or change information displayed on the display area 110. When the user approaches a part of the body to the input areas 112, 114, 116 and 118, the sensing modules 122, 124, 126 and 128 may sense an approach of the body of the user to generate a sensing signal. The sensing signals generated by the sensing modules 122, 124, 126 and 128 may be transmitted to a control module (not shown). The control module (not shown) may transmit the information that the user requests to a display module 120 according to a received sensing signal. The display module 120 may output received information, and the user can recognize information outputted through the display area 110.

In the embodiment shown in FIG. 9, the display area 110 may have a circular shape, and the input areas 112, 114, 116, and 118 may be arranged around the display area 110. However, a shape and an arrangement of the display area 110 and the input areas 112, 114, 116, and 118 may vary depending on the embodiment. For example, the input areas 112, 114, 116, and 118 may be arranged in a row horizontally, vertically, or diagonally, and the display area 110 may be arranged at a completely different position, not a center of the input areas 112, 114, 116, and 118. At this time, the display module 120 and the sensing modules 122, 124, 126, and 128 shown in FIG. 9 may also be changed to correspond to the positions of the display area 110 and the input areas 112, 114, 116, and 118.

The input/output interface module 106 may perform a function to receive a control command from a user and output information corresponding to an inputted control command. The input/output interface module 106 may include a display module 120 for outputting information, the sensing modules 122, 124, 126 and 128 for receiving the control command from the user, and the control module (not shown) that determines the information to be outputted to the display module 120 according the sensing signal which is generated when the sensing modules 122, 124, 126, and 128 sense the command of the user. The display module 120 and the sensing modules 122, 124, 126 and 128 may be arranged at a position corresponding to a display area 110 and the input areas 112, 114, 116, and 118, respectively, on a front panel 541.

The display module 120 may output specific information according to an electrical signal applied from a control module (not shown). Various display devices such as an LCD panel or a light emitting diode panel can be used as the display module 120 according to the embodiment.

In the embodiment shown in FIG. 9, the display module 120 may be mounted on a substrate of the input/output interface module 106 together with the sensing modules 122, 124, 126, and 128. However, in another embodiment of this application, the display module 120 may be realized in a form of mounting a surface of a light emitting element and a conducting wire on a rear surface of a front panel 541 and a front surface of a first insulation panel 542a. Further, in another embodiment of this application, the display module 120 may be realized in a substrate form such as an FPCB mounted with the light emitting element and the conducing wire and may be attached on the rear surface of the front panel 541 or the front surface of the first insulation panel 542a.

The sensing modules 122, 124, 126 and 128 may output an optical signal of a predetermined wavelength and receive a reflected optical signal when an outputted optical signal is reflected on an object. The sensing modules 122, 124, 126, and 128 may generate a sensing signal and transmit a generated sensing signal to a control module (not shown) when an intensity of a received optical signal exceeds a predetermined reference value. Accordingly, the control module (not shown) may recognize an approach of an object (for example, a finger of a user) and transmit a control command or information according to the function assigned to each sensing module 122, 124, 126, and 128 to a display module 120 or another module. In the embodiment of FIG. 9, the sensing modules 122, 124, 126, and 128 may be mounted on the substrate of the input/output interface module 106. However, depending on the embodiment, the sensing modules 122, 124, 126, and 128 may be attached directly on the rear surface of the front panel 541 or the first insulation panel.

A first spacer 543a may be arranged in the perimeter of a rear surface of the front panel 541. The first spacer 543a may separate the front panel 541 and the first insulation panel 542a from each other and seal the front panel 541 and the first insulation panel 542a. Further, a second spacer 543b may be arranged in the perimeter of the rear surface of the first insulation panel 542a. The second spacer 543b may separate a first insulation panel 542a and a second insulation panel 542b from each other and seal the first insulation panel 542a and the second insulation panel 542b.

In the embodiment of this application, when the front panel 541, the first spacer 543a, and the first insulation panel 542a are coupled, a sealed space may be formed between the front panel 541 and the first insulation panel 542a. Similarly, when the first insulation panel 542a, the second spacer 543b, and the second insulation panel 542b are coupled, a sealed space may be formed between the first insulation panel 542a and the second insulation panel 542b. The sealed space thus formed may be formed in a vacuum state to prevent cool air inside a refrigerator from leaking to an outside, or may be filled with an inert gas such as argon gas.

The front panel 541 shown in FIG. 9 may be formed with a half mirror as described above. A special material such as a titanium compound (TiO2) may be deposited on the rear surface of the front panel 541 to exhibit such a property of the half mirror. Further, in another embodiment of this application, the front panel 541 may be formed of a glass material such as a dark gray glass which is capable of transmitting and seeing through light and that has a finely Dark gray color in a transparent state. Further, in another embodiment of this application, the front panel 541 may have a property of the half mirror due to a substance such as iron, cobalt, or chromium that is deposited on the surface.

Meanwhile, the insulation panels arranged in the rear direction of the front panel 541, that is, the first insulation panel 542a and the second insulation panel 542b may be made of a transparent material such as glass. The first insulation panel 542a and the second insulation panel 542b may also have the property of the half mirror such as the front panel 541; however, in order for the user to better see through the inside of the refrigerator, it is preferably that the first insulation panel 542a and the second insulation panel 542b are made of a material that has high transparency such as green glass.

Hereinafter, a configuration of the sensing modules 122, 124, 126, and 128 according to an exemplary embodiment of this application will be described in detail.

Figure 10:
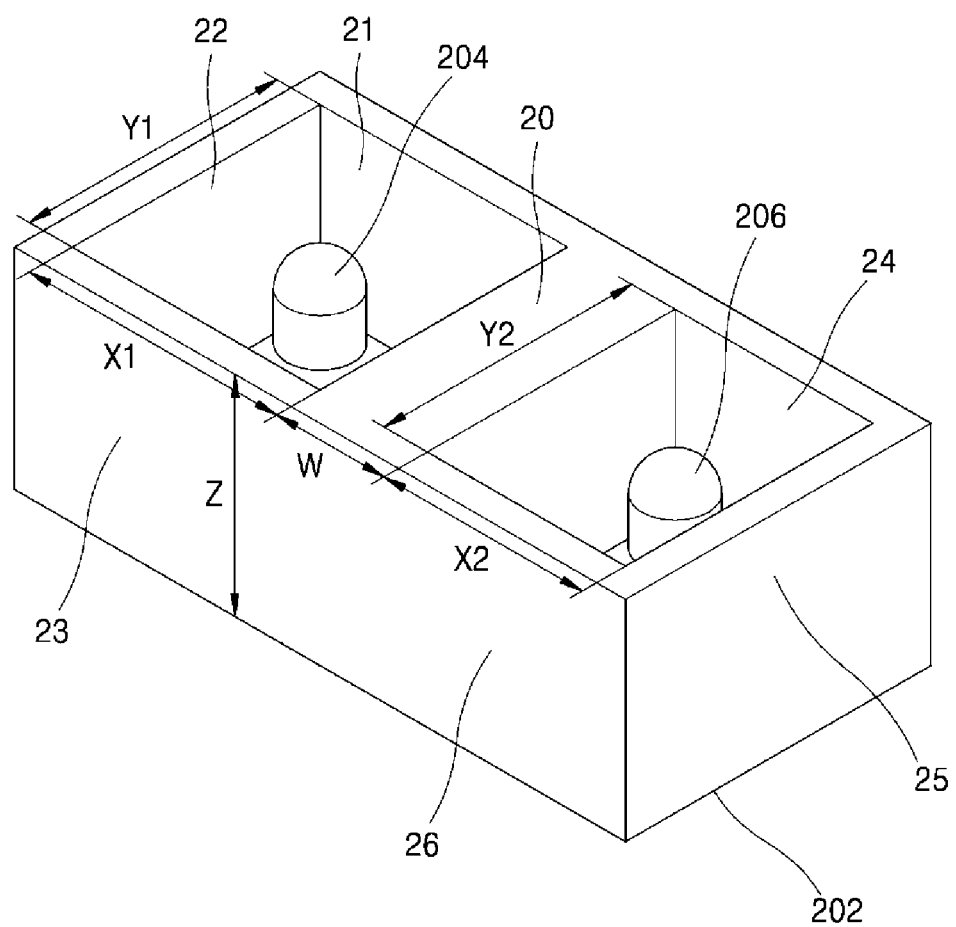
FIG. 10 is a configuration view of a sensing module according to an embodiment of this application.

FIG. 10 is a configuration view of a sensing module according to an exemplary embodiment of this application.

Referring to FIG. 10, a sensing module according to an exemplary embodiment of this application may include a device case 202, a light emitting element 204, and a light receiving element 206. The element case may include a first accommodation space made by the first walls 21, 22 and 23 and a partition 20 and a second accommodation space made by the second walls 24, 25 and 26 and a partition 20. The first accommodation space may have the volume according to the width X1, the length Y1 and the depth Z and the second accommodation space may have the volume according to the width X2, the length Y2, and the depth Z. A light emitting element 204 may be arranged in the first accommodation space and a light receiving element 206 may be arranged in the second accommodation space.

The light emitting element 204 may output an optical signal that has a wavelength of a predetermined band, for example, a wavelength of an infrared light. A part of the optical signals outputted by the light emitting element 204 may be reflected by the front panel 541 of FIG. 9 and incident on a light receiving element 206 direction. A part of the optical signals outputted by the light emitting element 204 may pass through the front panel 541 of FIG. 9 and are emitted to an outside of the front panel 541. At this time, when an object (for example, the finger of the user) approaches on the front panel 541, an optical signal that passes through the front panel 541 may be reflected on an object. A part of the optical signals reflected by the object may pass through the front panel 541 and incident on the light receiving element 206 direction. The light receiving element 206 that receives the optical signal reflected on the object may generate a sensing signal and transmit a generated sensing signal to a control module (not shown). Accordingly, an approach of an object, that is, an input of a control command, may be sensed on the input areas 112, 114, 116, and 118.

In an embodiment of this application, the volume of the first accommodation space may be larger than the volume of the second accommodation space. As described above, a difference in volume may be intended to reduce an amount of optical signal outputted by the light emitting element 204 and reflected by a panel to be received by the light receiving element 206.

Further, in an embodiment of this application, the width W of an upper surface of the partition 20 may be equal to or larger than the width of a light emitting element 204 or the width of a light receiving element. As described above, the width of the partition 20 may also be intended to reduce an amount of an optical signal outputted by a light emitting element 204 and reflected by a panel to be received by a light receiving element 206.

In the embodiment shown in FIG. 10, a sensing module may be shown to be made of a light emitting element 204 and a light receiving element 206, respectively. However, in another embodiment of this application, the number of light emitting elements and the number of light receiving elements included in a sensing module may be different. For example, a sensing module may include a light emitting element and two light receiving elements symmetrically arranged about the light emitting element.

In an embodiment of this application, a cross section of the light emitting element 204 or the light receiving element 206 may have a hemispherical shape. In particular, in order to increase a sensing rate of a sensing module, it is preferable that the cross section of the light emitting element 204 has a hemispherical shape. The cross sectional shape of the light emitting element 204 or the light receiving element 206 may vary depending on the embodiment.

Further, in an embodiment of this application, a light receiving element 206 may include a dye for reflecting an optical signal of a predetermined wavelength. For example, when the light receiving element 206 is configured to receive an optical signal that has a wavelength in an infrared band, the light receiving element 206 can include a dye capable of blocking an optical signal that has a wavelength in a band excluding an infrared band, for example, a visible light band.

Figure 11:
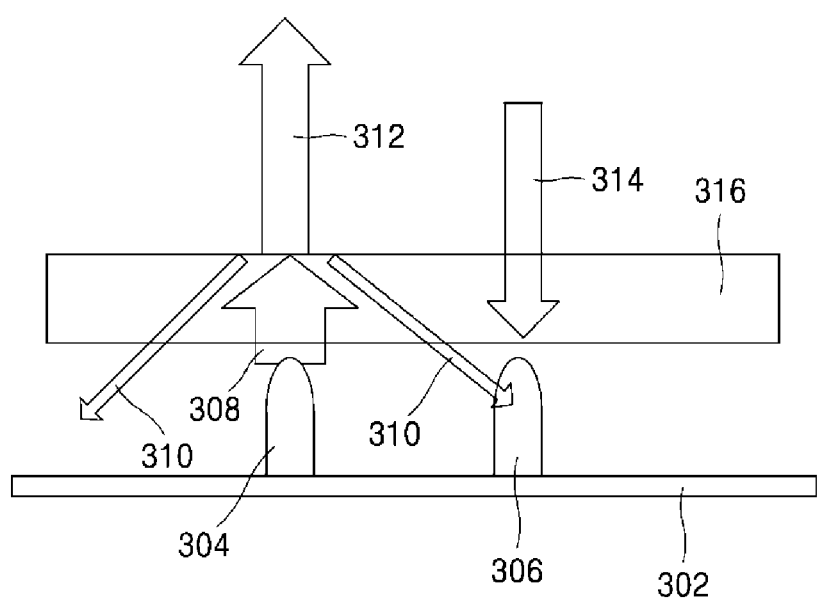
FIG. 11 is a view showing an intensity of an optical signal outputted from a light emitting element and an intensity of an optical signal that a light receiving element receives when applying a front panel that has a high light transmittance in an embodiment of this application.

FIG. 11 is a view showing an intensity of an optical signal outputted from a light emitting element and an intensity of an optical signal that a light receiving element receives when a front panel that has a high light transmittance is applied in an exemplary embodiment of this application.

As mentioned above, the front panel may have a property of the half mirror, that is, a property of transmitting only a part of incident light. The embodiment of FIG. 11 may show a case in which a front panel 316 that has no such half-mirror property, that is, a front panel 316 that has a relatively high light transmittance is used.

In an exemplary embodiment of this application, a light emitting element 304 arranged on a substrate 302 may output an optical signal that has a predetermined band of wavelength (for example, a wavelength in an infrared ray region). A part of an optical signal 308 outputted by the light emitting element 304 may be reflected by a front panel 316. An optical signal 310 reflected by the front panel 316 may be incident in the front panel 316 without passing through a front panel 316, and the light receiving element 306 may receive a part of the optical signal 310. A part of the optical signals 308 outputted by the light emitting element 304 may pass through the front panel 316 and may be emitted outside the front panel 316. An emitted optical signal 312 may be reflected by an object (for example, a finger of a user) approaching a front surface of a front panel 316. An optical signal 314 reflected by an object may pass through a front panel 316 and may be received by a light receiving element 306.

Figure 12:
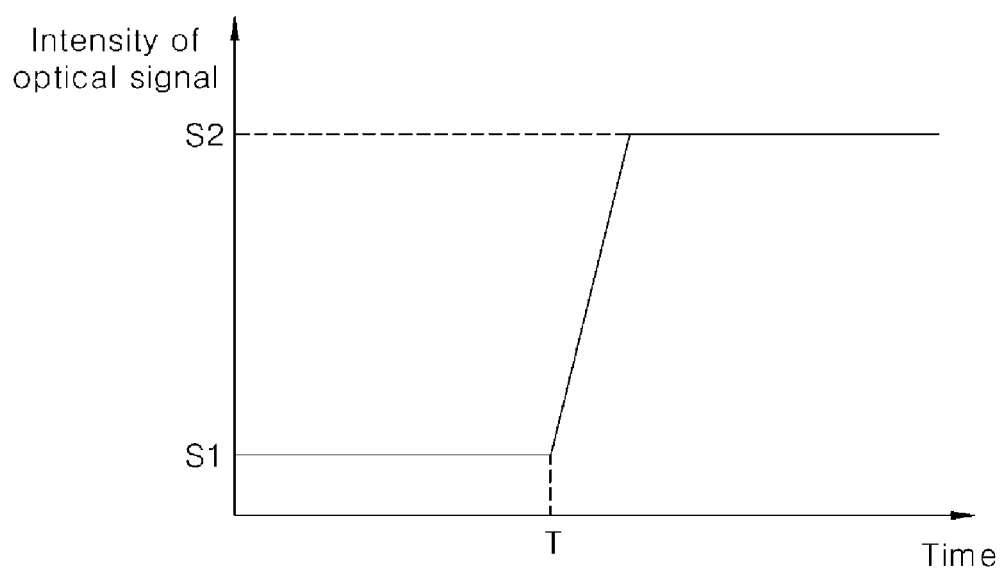
FIG. 12 is a graph showing an intensity of an optical signal that a light receiving element is received before and after the optical signal outputted from the light emitting element in the embodiment of FIG. 11 is reflected on an object.

FIG. 12 is a graph showing an intensity of an optical signal that a light receiving element receives before and after an optical signal outputted from the light emitting element in the embodiment of FIG. 11 is reflected to an object.

Referring to FIGS. 11 and 12, only an optical signal 310 reflected by a front panel 316 may be received by a light receiving element 306 before time T, based on time T that an object approaches a front panel 316. An intensity of an optical signal that the light receiving element 306 receives may be S1. Meanwhile, after the time T, an optical signal 314 reflected to the object, in addition to the optical signal 310 may be received by the light receiving element 306. Thus, after the time T, an intensity of an optical signal that the light receiving element 306 receives may be increased from S1 to S2.

Figure 13:
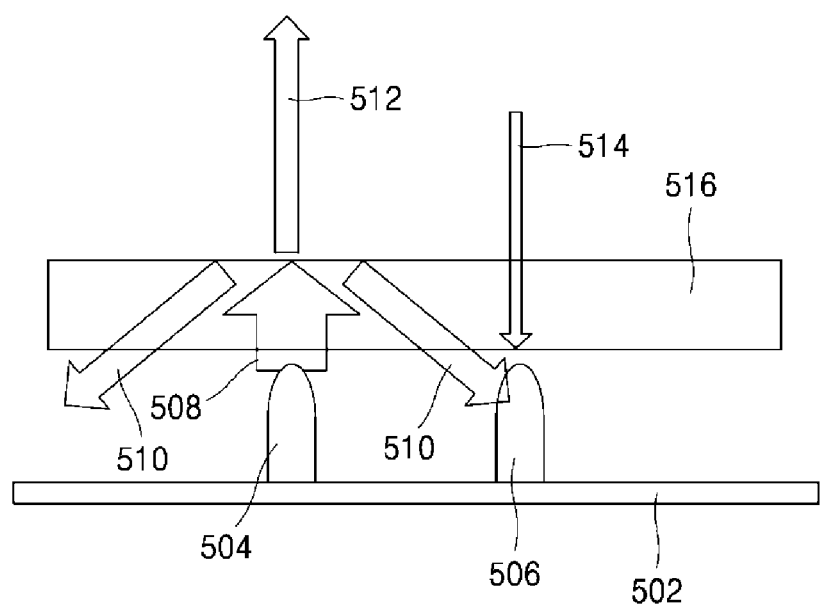
FIG. 13 is a view showing an intensity of an optical signal outputted from a light emitting device and an intensity of an optical signal that a light receiving element receives when applying a front panel that has a low light transmittance in an exemplary embodiment of this application.

FIG. 13 is a view showing an intensity of an optical signal outputted from a light emitting element and an intensity of an optical signal that a light receiving element receives when applying a front panel that has a low light transmittance in an exemplary embodiment of this application.

In the embodiment of FIG. 13, the front panel 516 may have a property of a half mirror and may show a case in which a light transmittance is relatively lower than that of the front panel 316 shown in FIG. 11.

In an exemplary embodiment of this application, a light emitting element 504 arranged on a substrate 502 may output an optical signal that has a predetermined band of a wavelength (for example, a wavelength in an infrared region). A part of an optical signal 508 outputted by the light emitting element 504 may be reflected by a front panel 516 made of a transparent material. An optical signal 510 reflected by the front panel 516 may not pass through the front panel 516 and may be incident on the front panel 516, and the light receiving element 506 may receive a part of the optical signal 510. A part of the optical signal 508 outputted by the light emitting element 504 may pass through the front panel 516 and may be emitted to an outside of the front panel 516. An emitted optical signal 512 may be reflected by an object (for example, a finger of a user) approaching a front panel 516. An optical signal 514 reflected by an object may pass through a front panel 516 and may be received by a light receiving element 506.

Figure 14:
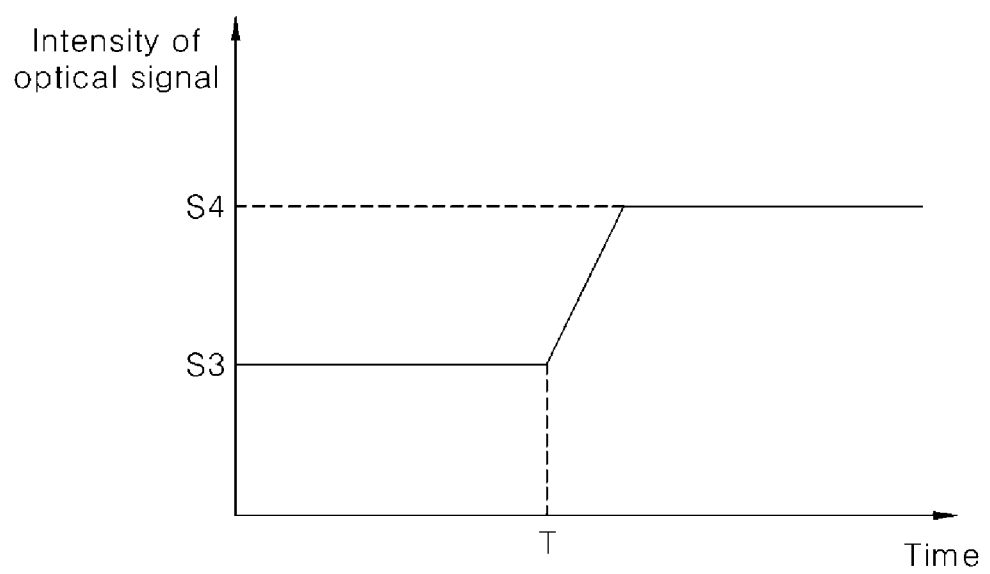
FIG. 14 is a graph showing an intensity of an optical signal that a light receiving element receives before and after the optical signal outputted from the light emitting element in the embodiment of FIG. 13 is reflected on an object.

FIG. 14 is a graph showing an intensity of an optical signal that a light receiving element receives before and after an optical signal outputted from a light emitting element in the embodiment of FIG. 13 is reflected to an object.

Referring to FIGS. 13 and 14, only an optical signal 510 reflected by a front panel 516 may be received by a light receiving element before time T, based on time T that an object approaches a front panel 516. An intensity of an optical signal that a light receiving element 506 receives may be S3.

A shown in FIGS. 11 to 14, when a coating or a material for a special function is applied to the front panel 516 and the light transmittance of the front panel 516 is lowered, an amount of the optical signal 510 reflected by the front panel 516 may be greater than an amount of optical signal 310 when the light transmittance of the panel 316 is high. Accordingly, the amount of the optical signal 512 that passes through the front panel 516 may be smaller than the amount of the optical signal 312 when the light transmittance of the panel 316 is low. Therefore, S3 may be larger than S1.

Meanwhile, after the time T, not only the optical signal 510 but also the optical signal 514 reflected on the object may be also received by the light receiving element 506. Accordingly, an intensity of an optical signal that the light receiving element 506 receives after the time T may increase from S3 to S4. As shown in FIG. 13, when the light transmittance of the front panel 516 is increased, the amount of the optical signal 512 that passes through the front panel 516 may be reduced, and accordingly, the amount of the optical signal 514 reflected on the object and incident on the front panel 516 may also be reduced. Therefore, S4 may be smaller than S2.

As a result, when the light transmittance of the front panel 516 is lowered due to an application of the coating or the material to the front panel 516, the amount of the optical signal 510 reflected inside the front panel 516 without passing through the front panel 516 may increase. Since the optical signal 510 may be received by the light receiving element 506 as itself, there is a problem of reducing a sensing rate of a light receiving element 506. In this application, in order to such a problem, the element case that has the partition 20, a first accommodation space, and a second accommodation space may be applied as shown in FIG. 10.

Figure 15:
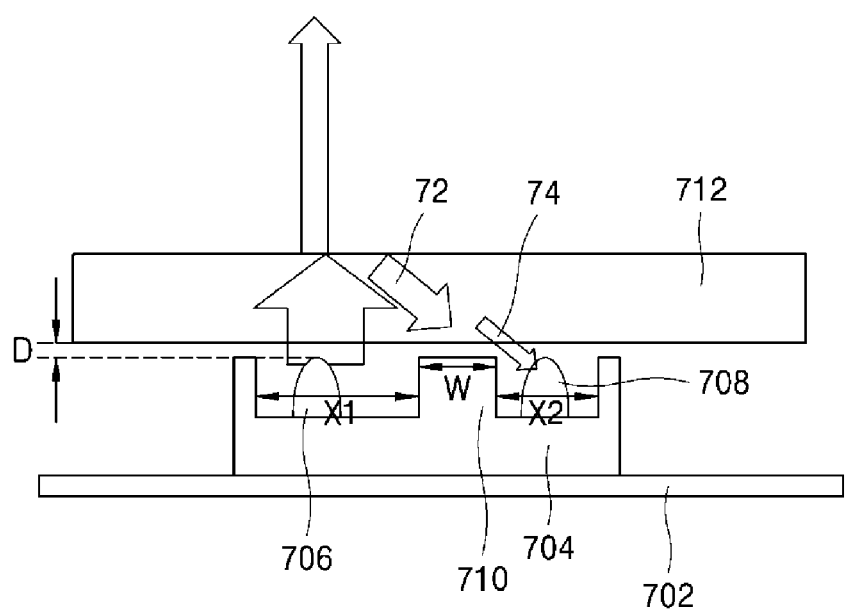
FIG. 15 is a view for explaining a change in intensity of an optical signal due to a partition provided in an element case of a sensing module according to an exemplary embodiment of this application.

FIG. 15 is a view for explaining a change in intensity of an optical signal due to a partition provided in an element case of a sensing module according to an exemplary embodiment of this application.

As shown in FIG. 15, a device case 704 may be arranged on a substrate 702. The element case 704 may include a first accommodation space and a second accommodation space formed about a partition 710. A light emitting element 706 may be arranged in the first accommodation space, and a light receiving element 708 may be arranged in the second accommodation space.

As described through FIGS. 11 to 14 in the above, as an optical signal 72 reflected by a front panel 712 among the optical signals outputted by the light emitting element 706 may be directly incident on a light receiving element 708 as itself, an intensity of the optical signal 72 that the light receiving element 708 receives may affect a sensing rate of the light receiving element 708. Accordingly, in this application, in order to reduce an amount of the optical signal 72 that the light receiving element 708 receives, a partition 710 that has a predetermined width W between a light emitting element 706 and a light receiving element 708 may be arranged. The optical signal 72 reflected by the front panel 712 due to a presence of the partition 710 as shown in FIG. 15 may be blocked by a part of the partition 710. As a result, an amount of the optical signal 74 that is blocked by the partition 710 and is incident on the light receiving element 708 may be smaller than an amount of the optical signal 72 before it is blocked by the partition 710. In order to increase an effect of blocking the optical signal, it is preferable that the width W of the partition 710 may be set to be equal to or larger than the width of the light emitting element or the width of the light receiving element.

Further, in an embodiment of this application, the light receiving element 708 may need to receive more optical signals incident through a front panel 712 after being reflected by an object. Therefore, as shown in FIG. 15, a transverse length X2 of the second accommodation space can be set smaller than a transverse length X1 of the first accommodation space. Accordingly, the volume of the second accommodation space can be made smaller than the volume of the first accommodation space. As described above, when the volume of the second accommodation space is set smaller than that of the first accommodation space, it is possible to reduce the influence on the optical signal 72 reflected by the front panel 712 without influencing on the amount of the optical signal incident through the front panel 712 after being reflected by the object. Therefore, such a structure can contribute to increase a sensing rate of the sensing module.

Meanwhile, in the embodiment of this application, a distance between the light emitting element 706 and the light receiving element 708 may be determined based on an intensity of the optical signals 72 and 74 reflected by the front panel 712 and received by the light receiving element 708 and the intensity of the optical signal reflected by the object and received by the light receiving element 708 through the front panel 712. The distance between the light emitting element 706 and the light receiving element 708 can be determined experimentally. For example, the intensity of the optical signals 72 and 74 reflected by the front panel 712 and received by the light receiving element 708 and the intensity of the optical signal reflected by the object and received by the light receiving element 708 through the front panel 712 may be measured according to a change in distance between the light emitting element 706 and the light receiving element 708, respectively. Then, the distance in a case in which the intensity of the optical signals 72 and 74 reflected by the front panel 712 and received by the light receiving element 708 is the smallest and in a case in which the intensity of the optical signal reflected by the object and received by the light receiving element 708 through the front panel 712 is the largest may be determined between the light emitting element 706 and the light receiving element 708.

Further, in an exemplary embodiment of this application, an upper surface of the first accommodation space and am upper surface of the second accommodation space, that is, an upper surface of the element case 704 may be closely contacted with a rear surface of the front panel 712. In other words, D in FIG. 15 can be set to zero. As described above, when the upper surface of the element case 704 is closely contacted with the rear surface of the front panel 712, the partition 710 may be closely contacted with the rear surface of the front panel 712. Accordingly, the optical signal 72 reflected by the front panel 712 may be blocked more. At this time, the height of the light emitting element 706 and the light receiving element 708 may be set to be equal to or less than the height of the upper surface of the first accommodation space or the upper surface of the second accommodation space.

Figure 16:
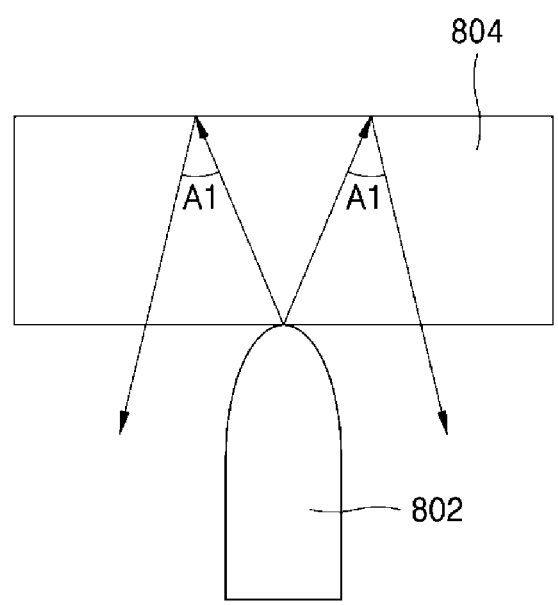
FIG. 16 is a view showing a reflection angle of an optical signal outputted from a light emitting device and reflected on a panel when a cross section of the light emitting device is a hemispherical shape in an embodiment of this application.
Figure 17:
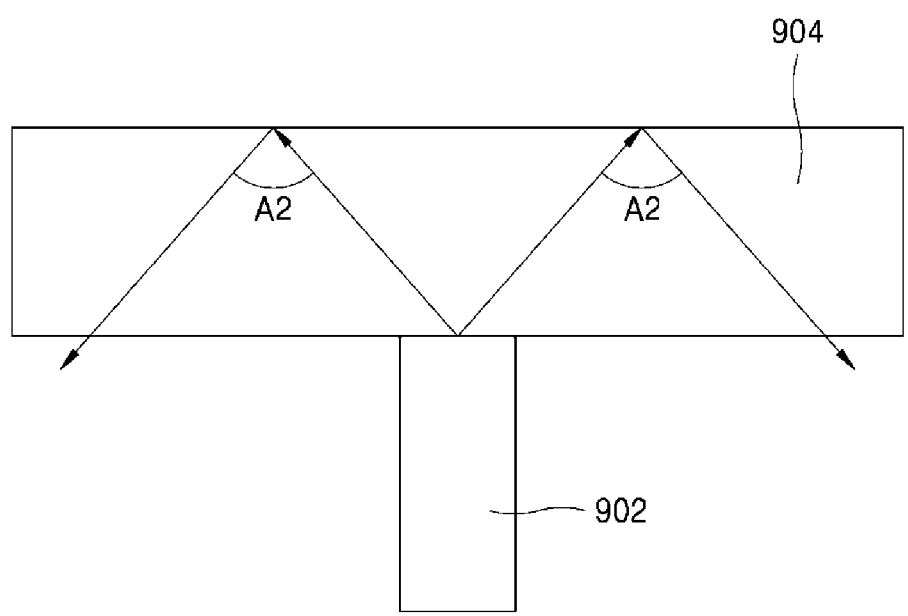
FIG. 17 is a view showing a reflection angle of an optical signal outputted from a light emitting device and reflected on a panel when a cross section of the light emitting device is a quadrangle in an exemplary embodiment of this application.

FIG. 16 is a view showing a reflection angle of an optical signal outputted from a light emitting element and reflected on a panel when a cross section of a light emitting element has a hemispherical shape in an exemplary embodiment of this application, and FIG. 17 is a view showing a reflection angle of an optical signal outputted from a light emitting element and reflected on a panel when the cross section of the light emitting element is a quadrangle in an exemplary embodiment of this application.

As shown in FIG. 16, when a cross section of a light emitting element 802 is a hemispherical shape, an angle of an optical signal outputted from a light emitting element 802, and reflected by a front panel 804, and incident on a light receiving element may be A1. Further, as shown in FIG. 17, when a cross section of a light emitting element 902 is a quadrangle, an angle of an optical signal outputted from a light emitting element 902 and reflected by a front panel 904 and incident on a light receiving element may be A2, which is larger than A1.

As a result, as shown in FIGS. 16 and 17, when the cross section of the light emitting element 802 is hemispherical shape, it is possible to reduce an angle of reflection of an optical signal reflected by the front panel 804. Accordingly, the range and the intensity of the optical signal reflected by the front panel 804 and incident on the light receiving element may become much smaller than when the cross section of the light emitting element 902 may be quadrangle. Accordingly, it is possible to further increase a sensing rate of a light receiving signal.

Various substitutions, changes, and modifications may be possible within the range that does not deviate the technical idea of this application for those skilled in the art to which this application pertains, the above-mentioned application is not limited by the above-mentioned embodiment and the accompanying drawings.

The invention claimed is:
1. A refrigerator, comprising:
a cabinet having a storage space formed therein;
a door that opens and closes the cabinet, the door having an opening that communicates with the storage space;
a panel that covers the opening and is configured to be transparent or opaque;

a sensing module provided in the opening and is configured to sense an object within a predetermined distance from a front surface of the panel; and a display module provided in the opening and configured to display information upon sensing the object by the sensing module, the information being displayed through a display area formed on the front surface of the panel, wherein the sensing module comprises:
- a transmitter that outputs a signal through the panel; and
- a receiver that receives a reflection of the signal by the object and generates a sensing signal in accordance with a reception of the reflected signal.

2. The refrigerator of claim 1, wherein the panel comprises:
- a front panel that forms a front surface of the door and includes a half mirror material that reflects a first portion of light and transmits a second portion of light;
- at least one insulation panel arranged at a predetermined distance from the front panel and made of a transparent glass material; and
- a spacer that separates and seals a space between the front panel and the at least one insulation panel.

3. The refrigerator of claim 2, wherein the sensing module and the display nodule are arranged in the space formed between the front panel and the at least one insulation panel.

4. The refrigerator of claim 1, wherein the sensing module further comprises a case, the case comprising:
- a first accommodation space that is formed a plurality of first walls and a partition and in which the transmitter is accommodated; and
- a second accommodation space that is formed by a plurality of second walls and the partition and in which the receiver is accommodated.

5. The refrigerator of claim 4, wherein a volume of the first accommodation space is larger than a volume of the second accommodation space.

6. The refrigerator of claim 4, wherein an upper surface of the case contacts a rear surface of the panel.

7. The refrigerator of claim 4, wherein a width of an upper surface of the partition located between the first accommodation space and the second accommodation space is equal to or larger than a width of the transmitter or a width of the receiver.

8. The refrigerator of claim 1, wherein a distance between the transmitter and the receiver is determined by an intensity of a third optical signal reflected by the panel and received by the receiver and an intensity of the second optical signal reflected by the object and received by the receiver.

9. The refrigerator of claim 1,
wherein the sensing module further comprises:
- the transmitter; and
- two or more receivers symmetrically arranged about the transmitter.

10. The refrigerator of claim 1, wherein a top of the transmitter has a hemispherical shape.

11. The refrigerator of claim 1, wherein the receiver comprises a dye that reflects an optical signal that has a wavelength of a predetermined band.

12. A refrigerator, comprising:
a cabinet having a storage space formed therein;
a main door that opens and closes the cabinet and has an opening that communicates with the storage space;
a sub-door that is rotatably mounted on the main door and opens and closes the opening;
a panel assembly that forms a front surface of the sub-door and is configured to be transparent or opaque;
a sensing module provided inside the panel assembly and configured to sense a proximity of an object at a predetermined area of the panel assembly; and
a display module provided inside the panel assembly that is configured to display information upon sensing the object by the sensing module,
wherein the sensing module comprises:
- a transmitter that outputs a signal through the panel assembly; and
- a receiver that receives a reflection of the signal by the object and generates a sensing signal in accordance with a reception of the reflected signal to send to the display.

13. The refrigerator of claim 12, wherein the sensing module further comprises:
- a first accommodation space that is formed by one or more first walls and a partition and in which the transmitter is accommodated; and
- a second accommodation space that s formed by one or more second walls and the partition and in which the receiver is accommodated.

14. The refrigerator of claim 13, wherein a width of an upper surface of the partition is equal to or larger than a width of the transmitter or a width of the receiver.

15. The refrigerator of claim 12, wherein a distance between the transmitter and the receiver is determined by an intensity of a third optical signal reflected by a front panel comprised in the panel assembly and received by the receiver and an intensity of the second optical signal reflected by the object and received by the receiver.

16. A transparent display for a door, the transparent display comprising:
a front panel configured to be transparent or opaque;
a transparent insulation panel provided at a predetermined distance from the front panel;
a spacer that seals a space between the front panel and the insulation panel;
a sensing module provided in the space between the front panel and the insulation panel and configured to sense an object within a predetermined distance from a front surface of the front panel; and
a display module provided in the space between the front panel and the insulation panel and configured to display information through the front panel upon sensing the object by the sensing module, wherein the sensing module further comprises:
- a transmitter that outputs a signal through the front panel; and
- a receiver that receives a reflection of the signal by the object and generates a sensing signal in accordance with a reception of the reflected signal.

17. The transparent display of claim 16, wherein the sensing module further comprises a case, the case comprising:
- a first accommodation space that s formed by one or more first walls and a partition and in which the transmitter is accommodated; and
- a second accommodation space that is formed by one or more second walls and the partition and in which the receiver is accommodated.

18. The transparent display of claim 17, wherein a top surface of the case contacts a rear surface of the front panel.

19. The transparent display of claim 17, wherein a volume of the first accommodation space is larger than a volume of the second accommodation space, and wherein a width of the partition located between the first accommodation space and the second accommodation space is equal to or greater than a width of the transmitter.

20. The transparent display of claim 17, wherein a top of the transmitter has a hemispherical shape.

\* \* \* \* \*